(12) United States Patent
Haggerty et al.

(10) Patent No.: US 8,874,388 B2
(45) Date of Patent: Oct. 28, 2014

(54) METHOD AND SYSTEM FOR MEASURING A RATE OF FLOW OF AN OUTPUT

(75) Inventors: Sean Haggerty, North Haven, CT (US); Andrew Terwilliger, Agawam, MA (US)

(73) Assignee: On Site Gas Systems, Inc., Newington, CT (US)

( * ) Notice: Subject to any disclaimer, the term of this patent is extended or adjusted under 35 U.S.C. 154(b) by 527 days.

(21) Appl. No.: 12/881,330

(22) Filed: Sep. 14, 2010

(65) Prior Publication Data
US 2011/0066293 A1     Mar. 17, 2011

Related U.S. Application Data

(60) Provisional application No. 61/242,419, filed on Sep. 15, 2009.

(51) Int. Cl.
| | | |
|---|---|---|
| *G01F 1/34* | (2006.01) | |
| *G01F 1/88* | (2006.01) | |
| *G01F 1/00* | (2006.01) | |
| *G01F 3/38* | (2006.01) | |
| *G01F 22/02* | (2006.01) | |

(52) U.S. Cl.
CPC .. *G01F 3/38* (2013.01); *G01F 1/34* (2013.01); *G01F 1/88* (2013.01); *G01F 1/007* (2013.01); *G01F 22/02* (2013.01)
USPC .................. 702/45; 702/47; 702/50; 702/55; 702/100; 700/282

(58) Field of Classification Search
USPC .................. 702/45, 47, 50, 55, 100, 138, 156
See application file for complete search history.

(56) References Cited

U.S. PATENT DOCUMENTS

| | | | | |
|---|---|---|---|---|
| 4,840,064 A | * | 6/1989 | Fudim | 73/290 B |
| 5,563,353 A | * | 10/1996 | Ferri | 73/861.48 |
| 5,636,653 A | * | 6/1997 | Titus | 137/14 |
| 5,636,971 A | * | 6/1997 | Renedo Puig et al. | 417/5 |
| 6,722,352 B2 | * | 4/2004 | Smolarek et al. | 123/585 |
| 7,044,002 B2 | * | 5/2006 | Ericson et al. | 73/861.52 |
| 7,904,257 B2 | * | 3/2011 | Nakada et al. | 702/47 |
| 2003/0172745 A1 | * | 9/2003 | Mitchinson | 73/861.49 |
| 2005/0138919 A1 | * | 6/2005 | Nakano et al. | 60/284 |
| 2007/0079892 A1 | * | 4/2007 | Cohen et al. | 141/105 |
| 2008/0264419 A1 | * | 10/2008 | Lomask et al. | 128/204.23 |
| 2008/0300727 A1 | * | 12/2008 | Zarowny et al. | 700/282 |
| 2009/0221986 A1 | * | 9/2009 | Wang et al. | 604/503 |
| 2010/0189572 A1 | * | 7/2010 | Hansen | 417/44.1 |

* cited by examiner

*Primary Examiner* — Sujoy Kundu
*Assistant Examiner* — Paul D Lee
(74) *Attorney, Agent, or Firm* — MKG, LLC

(57) ABSTRACT

A system and method for determining a rate of flow of an output from a vessel. The system includes a vessel having an inlet for receiving an output produced by an output generation device, and a measuring device for measuring a first pressure and a second pressure in the vessel. The first pressure is measured when the output generation device is in a standby mode and the second pressure is measured when the output generation device is in an operational mode. The system includes a programmable logic controller configured to calculate a rate of flow of the output utilizing the first pressure and the second pressure.

18 Claims, 3 Drawing Sheets

METHOD AND SYSTEM FOR MEASURING A RATE OF FLOW OF AN OUTPUT

CROSS REFERENCE TO RELATED APPLICATIONS

This application claims priority to U.S. Provisional Patent Application Ser. No. 61/242,419 entitled "Method and System for Measuring a Rate of Flow of an Output" filed on Sep. 15, 2009, the disclosure of which is incorporated herein in its entirety.

BACKGROUND

1. Technical Field

The disclosed subject matter generally relates to a method and system for measuring a rate of flow of an output generated by an output generation device. Particularly, the disclosed subject matter relates to a method and system of determining a rate of flow of an output by measuring the change in pressure in a vessel.

2. Related Art

Flow, or "rate of flow," refers to a measurement of an amount of gas that travels through a given location. Determination of a rate of flow of a gas within a system allows a user to determine whether the system is running at optimal efficiency and/or is functioning properly.

Flow can be measured in volumetric or mass flow rates. Many systems employ a flowmeter to determine the flow of the gas. Flowmeters are generally known in the art, and include but are not limited to, differential pressure flowmeters, velocity flowmeters, positive displacement flowmeters, mass flowmeters, and open channel flowmeters.

Determination of the rate of flow of a gas without the use of additional equipment may simplify the system and the method for using the system. Additionally, determination of a rate of flow within a system may lower the expenses of operating and maintaining the system.

SUMMARY

According to aspects illustrated herein, there is provided a system for determining a rate of flow of an output, the system comprising: a vessel having an inlet for receiving an output produced by an output generation device; a measuring device for measuring a first pressure and a second pressure in the vessel, the first pressure measured when the output generation device is in a standby mode and the second pressure measured when the output generation device is in an operational mode; and a programmable logic controller configured to calculate a rate of flow of the output utilizing the first pressure and the second pressure.

According to other aspects illustrated herein, there is provided a method for determining a rate of flow of an output from a vessel, the method comprising: measuring a first pressure in a vessel and recording a start time, the first pressure being measured and the start time recorded when an output is not provided to the vessel; measuring a second pressure in the vessel and recording a stop time, the second pressure being measured and the stop time recorded when the output is provided to the vessel; calculating a change in storage volume of the vessel; and utilizing the change in storage volume to calculate a rate of flow of the output from the vessel.

According to a further aspect illustrated herein, there is provided a method of determining a rate of flow of an output, the method comprising: providing an output to a vessel, the output generated by an output generation device; measuring a first pressure in the vessel, the first pressure measured when the output generation device is in a standby mode; measuring a second pressure in the vessel, the second pressure measured after measuring the first pressure and while the output generation device is in an operational mode; and utilizing the first pressure and the second pressure to calculate a change in storage volume of the vessel, wherein the change in storage volume is utilized to calculate a rate of flow of the output from the vessel.

These aspects, as well as others, are described in more detail herein.

BRIEF DESCRIPTION OF THE DRAWINGS

Referring now to the figures, which are exemplary embodiments, and wherein the like elements are numbered alike.

DETAILED DESCRIPTION

Figure 1:
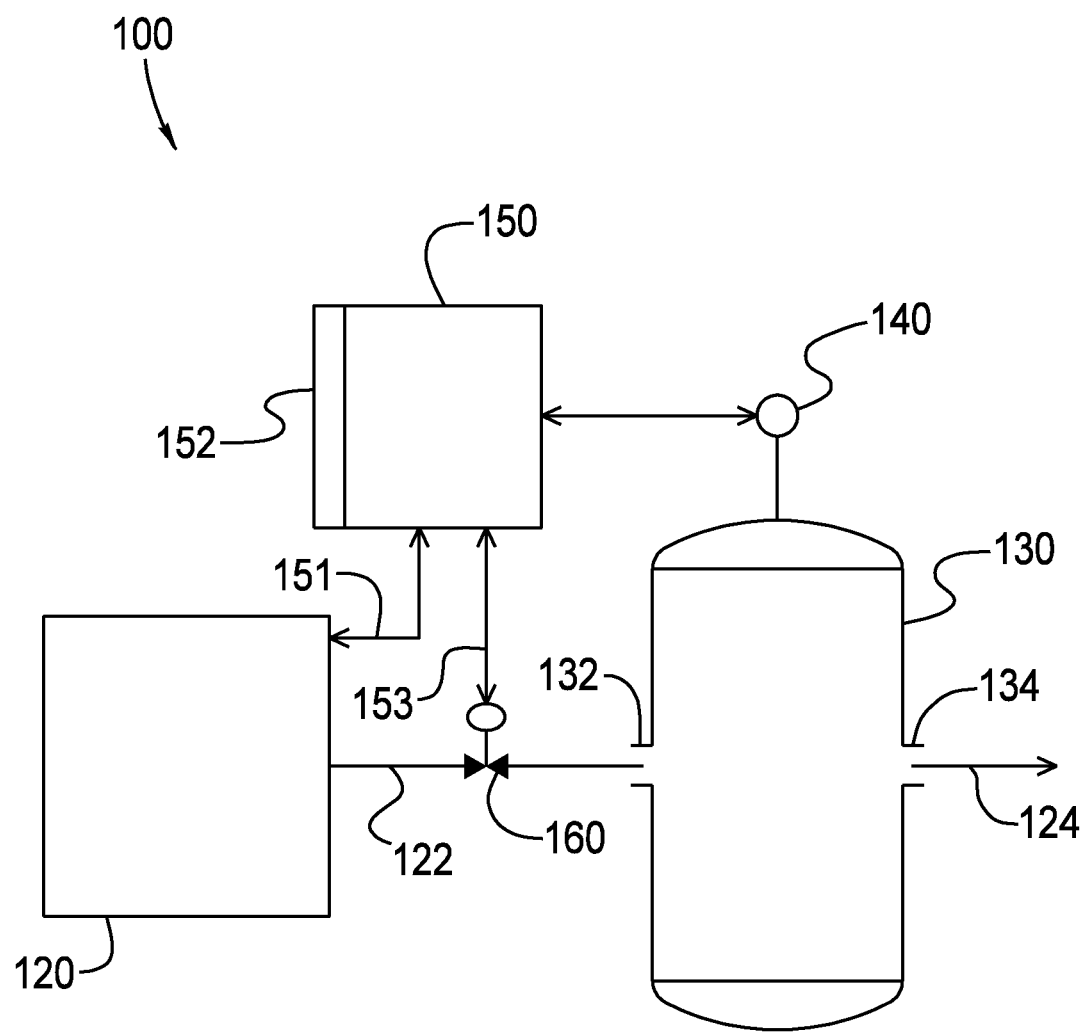
FIG. 1 depicts a system according to one embodiment disclosed herein.

FIG. 1 illustrates a system 100 for calculating a rate of flow of an output present and utilized in the system. Utilizing the system herein, it is contemplated that an average rate of flow of an output can be determined by determining a rate of flow at several different times and calculating an average based on the rates of flow. Accordingly, the system and methods disclosed herein are not limited in calculating a single rate of flow of an output, since many measurements and calculations may be taken over time.

System 100 includes an output generation device 120 that provides an output 122 to a vessel 130. While the system 100 shown in FIG. 1 includes only one output generation device 120 and one vessel 130, the system is not limited in this regard since it is contemplated that the system may have more than one output generation device and more than one vessel. Further, it is contemplated that one output generation device 120 may provide output 122 to more than one vessel 130. Alternatively, it is contemplated that more than one output generation device 120 may provide output 122 to one vessel 130.

Output generation device 120 may be any device capable of generating an output 122 that can meet an output demand of system 100. As used herein the term "output demand" refers to an amount of whatever output 122 the output generation device 120 produces and that is required or requested by system 100, i.e., required or requested by the end user of the system or required by the application in which the system is employed.

The type or kind of output generation device 120 used in the system 100 will vary depending on the system and the type of output 122 that is demanded by the system. For example, output generation device 120 may be a gas generation device, such as a pressure swing adsorption (PSA) system or a membrane gas generation device. Output generation device 120 may also include, but is not limited to a pump, or bottled gas cylinders.

Output 122 may be any product, energy or service demanded by system 100 or the application in which the system is employed. Output 122 is dependent upon the type of output generation device 120 employed in the system 100. Examples of output 122 include, but are not limited to gas (nitrogen, oxygen, hydrogen, ammonia, etc.), or any other type of material or service capable of being produced by output generation device 120.

Vessel 130 may be any vessel that can accept and contain output 122 that is generated by the output generation device 120. Vessel 130 will vary depending on the output 122 that is generated by the output generation device 120. Examples of vessel 130 include, but are not limited to, a conduit, a container such as a bottle, a tank such as a buffer tank, a pipeline, a water supply station, a room in a building, or the like.

Still referring to FIG. 1, vessel 130 includes an inlet 132 for receiving output 122 produced by output generation device 120. Inlet 132 may be any type of opening or mechanism that allows output 122 to proceed or flow from the output generation device 120 to the vessel 130. It is contemplated that inlet 132 may be located at any location or site along the vessel 130. Additionally, while not shown in FIG. 1, it is contemplated that vessel 130 may have more than one inlet 132 to accommodate the introduction of output 122 from other output generation devices 122. In one embodiment vessel 130 contains or holds the output 122 for a period of time before it is released through an outlet 134. Alternatively, the output 122 may simply flow through the vessel 130 through inlet 132 and out through outlet 134 without being contained or held in the vessel.

System 100 also includes a measuring device 140 for measuring a pressure in the vessel 130. The measuring device 140 may be any device that is capable of measuring pressure, including, but not limited to a pressure transducer or a pressure gauge. As shown in FIG. 1, the measuring device 140 is in fluid communication with the vessel 130.

In one embodiment, the measuring device 140 measures a first pressure and a second pressure in vessel 130. Neither the system 100 nor the measuring device 140 is limited in this regard as it is contemplated that the measuring device 140 may take additional successive measurements of the pressure in vessel 130, i.e., a third pressure and a fourth pressure. Measuring device 140 is capable of measuring the pressure in vessel 130 at any time. For example, the measuring device 140 may measure the pressure in vessel 130 at predetermined time increments, e.g., every five (5) minutes. In another embodiment the measuring device 140 may measure the pressure in vessel 130 when certain parameters occur, e.g., when output 122 is not provided to vessel 130.

In one example, a first pressure is measured when the output generation device 120 is not operating to introduce output 122 to the vessel 130, i.e., when the output generation device 120 is in a standby mode, while a second pressure is measured when the output generation device is operating to introduce output to the vessel, i.e., when the output generation device is in an operational mode. The term "standby," as used herein, means the output generating device 120 is turned off or is not generating output 122. As used herein, the term "operational" means that an output generation device 120 is turned on or is generating output 122.

Output generation device 120 may cycle between the standby mode and the operational mode. In one embodiment, output generation device 120 cycles between the standby mode and the operational mode at regular time intervals, i.e., at regularly timed intervals, for example, every five (5) or ten (10) minutes. In another embodiment, output generation device 120 cycles between the standby mode and the operational mode in a random fashion, i.e., there are no regular time intervals between the standby mode and the operational mode.

In another embodiment, the output generation device 120 cycles between the standby mode and the operational mode depending on the amount of output 122 present in the vessel 130. For example, if an amount of output 122 present in the vessel 130 falls below a certain amount, output generation device 120 is in the operational mode. However, if an amount of output 122 present in the vessel 130 rises to or above a certain amount the output generation device 120 is in the standby mode. The term "amount" as used herein means a quantity and encompasses any way to measure the quantity, i.e., by volume and the like. It is contemplated that the amount of output 122 present in the vessel 130 is ever-changing, i.e., it fluctuates depending on the needs of the system 100 and the amount of output 122 that flows out of the vessel through outlet 134.

It is contemplated that output 122 will flow out of vessel 130 as output 124 from time to time, thereby requiring output generation device 120 to supply more output to the vessel. In one example, output 122 is a gas, output generation device 120 is a pressure swing absorption system and vessel 130 is a buffer tank. Output 122, in the form of a gas, is provided to the vessel 130 for periodic storage before it exits through outlet 134 as output 124. Once an amount of the output 122 has reached a certain level in the vessel, the output generation device 120 goes into standby mode and the output is not generated and therefore not sent to the vessel 130. Over time, the amount of output 122 in vessel 130 will decrease, which in turn will trigger the output generation device 120 to be in an operational mode and will generate and provide output to the vessel. This cycle will continue to repeat unless the system 100 is programmed otherwise.

System 100 also includes a programmable logic controller 150. Programmable logic controller 150 is a processor, e.g., a computer, used for automation of processes, including, but not limited to, calculating a change in pressure. Programmable logic controller 150 may be any type of processor, including, but not limited to desktop computers, handheld computers, laptop computers, personal digital assistants, or other programmable logic controllers (PLCs).

As shown in FIG. 1, the programmable logic controller 150 is in communication with measuring device 140, output generation device 120, and a flow valve 160. The flow valve 160 has the capability of regulating the flow of output 122 from the output generation device 120 to the vessel 130.

It is contemplated that the programmable logic controller 150 can send and receive information to and from the devices it is in communication with, e.g., the output generation device 120, measurement device 140, and/or the flow valve 160. For example, programmable logic controller 150 may be programmed to place the output generation device 120 in either or both a standby mode or an operational mode by sending a signal (shown as line 151) to the output generation device.

Additionally, the programmable logic controller 150 may be programmed to close or open the flow valve 160. The flow valve 160 may be closed or opened to facilitate or stop the introduction of output 122 to the vessel 130. The flow valve 160 may also be closed to calculate the flow rate of the output 122. To close or open the flow valve 160, the programmable logic control 150 sends a signal, shown as line 153, to the flow valve.

In one embodiment, and as shown in FIG. 1, the programmable logic controller 150 includes a user interface 152. User interface 152 may be any interface that allows a user to communicate with or enter data into the programmable logic controller 150. Examples of the user interface 152 include, but are not limited to, a keyboard, a mouse, a touch screen, and the like.

The user interface 152 may also include a display adapted to convey information, such as the average flow of the output 122 out of the vessel 130, to a user. The Examples of the display may include, but are not limited to, a screen, a paper print out, and the like.

It is contemplated that system 100 does not include a flowmeter to measure the rate of flow of output through the vessel 130.

Figure 2:
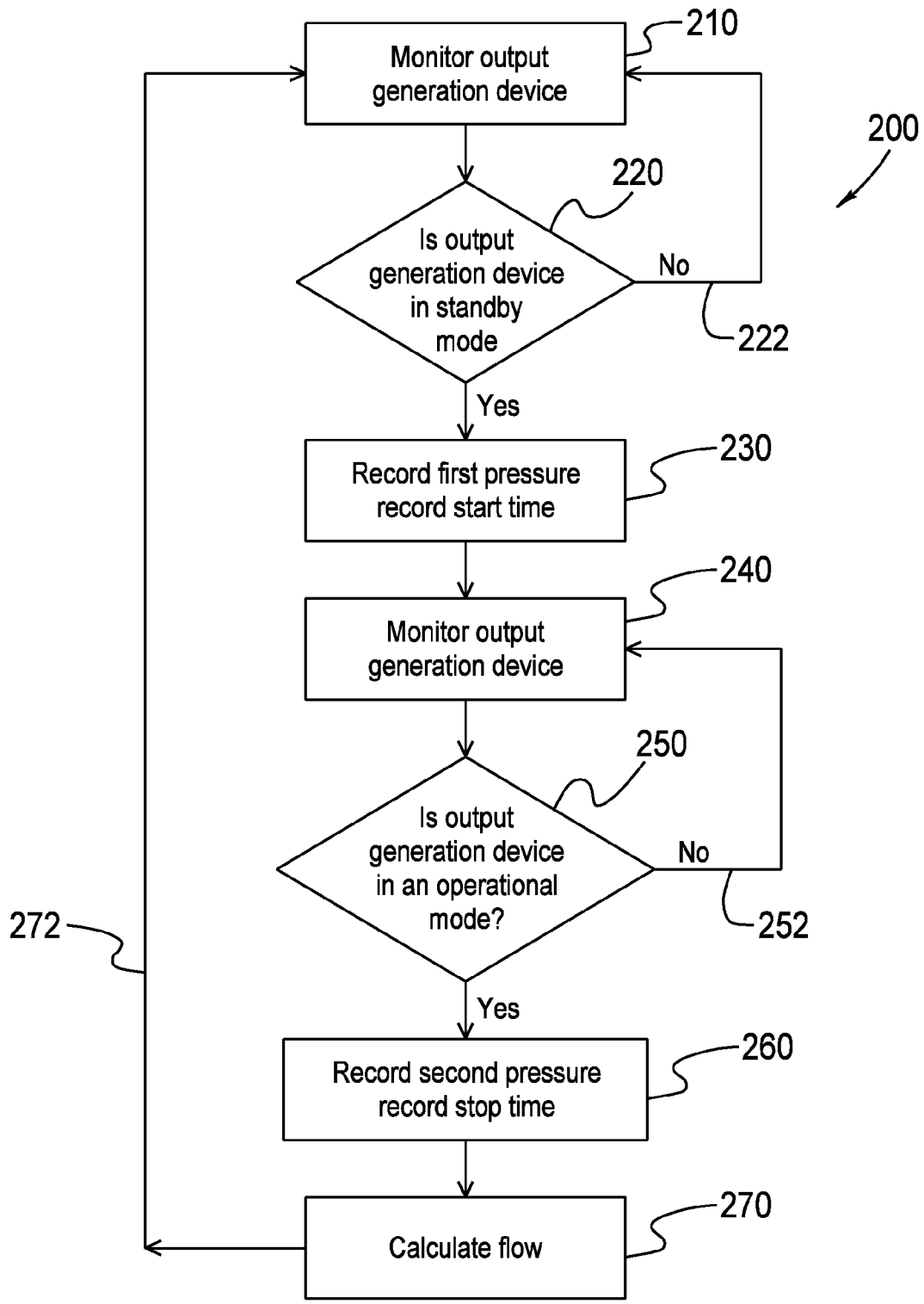
FIG. 2 is a flowchart illustrating a method determining a rate of flow of an output.

In use, system 100 can be utilized to determine a rate of flow or an average rate of flow calculated from multiple rates of flow determinations of output 124 from the vessel 130. As shown in FIG. 2, one embodiment of determining a rate of flow of output 124 includes a method 200, which involves monitoring the output generation device 120 and measuring a pressure in the vessel 130.

As shown in FIG. 2, in step 210 the output generation device 120 is monitored by programmable logic controller 150. The programmable logic controller 150 periodically monitors the status of whether the output generation device 120 is in standby mode or in an operational mode. As discussed above, the programmable logic controller 150 may monitor the status of the output generation device 120 in predetermined increments, e.g., every five (5) or ten (10) minutes, or it may monitor the status of the output generation device at random time intervals.

As shown in decision block 220, the programmable logic controller 150 determines if the output generation device 120 is in a standby mode. If the output generation device 120 is not in a standby mode, i.e., if it is in an operational mode, the programmable logic controller continues to monitor the output generation device as shown by direction path 222. If the programmable logic controller 150 determines the output generation device is in a standby mode in decision block 220, the output 122 is not provided to the vessel 130 and a first pressure in the vessel 130 and a start time is recorded as shown in step 230. In one embodiment, the first pressure in the vessel 130 is recorded by the measurement device 140, while the start time is recorded by the programmable logic controller 150.

After the first pressure and start time are recorded, the programmable logic controller 150 continues to monitor the status of the output generation device 120 as shown in step 240.

As shown in decision block 250, the programmable logic controller 150 determines if the output generation device 120 is in an operational mode. If the output generation device 120 is not in an operational mode, i.e., it is in a standby mode, the programmable logic controller continues to monitor the output generation device as shown by direction path 252. If the programmable logic controller 150 determines the output generation device 120 is in an operational mode in decision block 250, the output 122 is provided to the vessel 130 and a second pressure in the vessel 130 and a stop time is recorded by the measurement device 140 as shown in step 260. In one embodiment, the second pressure in the vessel 130 is recorded by the measurement device 140, while the stop time is recorded by the programmable logic controller 150.

After the programmable logic controller 150 records the second pressure in the vessel 130 and receives information about the stop time, the flow of the output 124 from the vessel is calculated in step 270.

Figure 3:
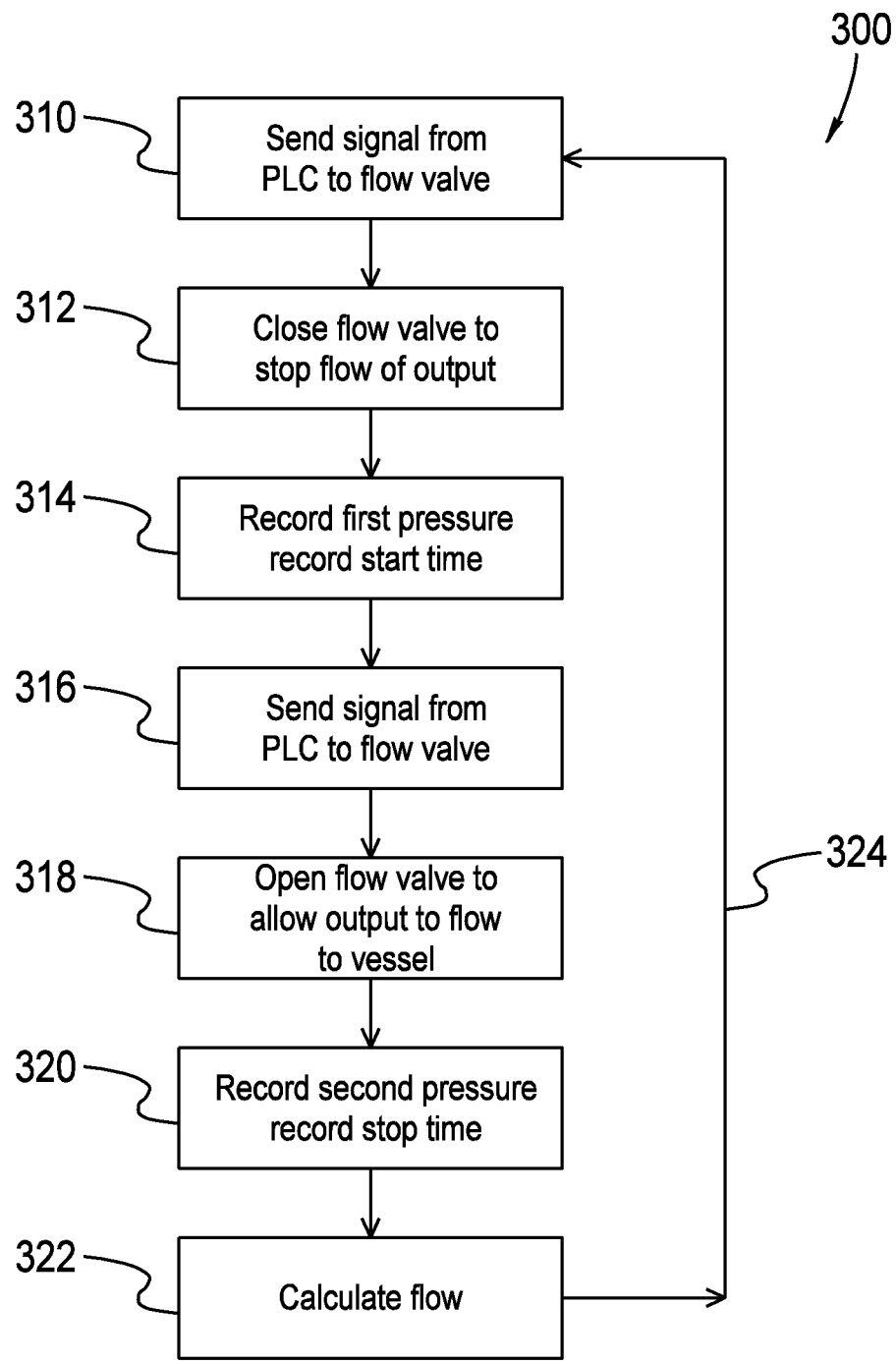
FIG. 3 is a flowchart illustrating a method determining a rate of flow of an output.

In another embodiment of determining the rate of flow of output 124 from the vessel 130 includes a method 300 as shown in FIG. 3, which includes closing and opening the flow valve 160.

As shown in FIG. 3, in step 310 a signal is sent from the programmable logic controller 150 to the flow valve 160. In step 312, the flow valve 160 is closed to stop the flow of output 122 to the vessel. After the flow valve 160 is closed in step 312, the output is not provided to the vessel.

In step 314, a first pressure of the vessel 130 and a start time is recorded. In one embodiment, the first pressure in the vessel 130 is recorded by the measurement device 140, while the start time is recorded by the programmable logic controller 150. The first pressure and the start time are recorded when output is not provided to the vessel 130.

In step 316, a signal is sent from the programmable logic controller 150 to the flow valve 160 instructing the flow valve to open, as shown in step 318. The signal may be sent to the flow valve 160 after a predetermined length of time has passed, e.g., five minutes after the control valve was closed, or may be sent after receiving instructions from a user via the interface 152. Once the flow valve 160 is open, the output 122 is provided to the vessel 130.

In step 320, when the output 122 is provided to the vessel 130, the second pressure is recorded and the stop time is recorded. In one embodiment, the second pressure in the vessel 130 is recorded by the measurement device 140, while the stop time is recorded by the programmable logic controller 150. The second pressure and the stop time are recorded when the output 122 is provided to the vessel 130.

After the programmable logic controller records the second pressure in the vessel 130 and receives information about the stop time the flow of the output 124 from the vessel is calculated in step 322.

In both methods 200 and 300, the flow of the output 124 from the vessel 130 may be calculated in any manner sufficient to do so. In one embodiment, the rate of flow is calculated by the programmable logic controller 150 by utilizing the first and second pressures and the start and stop time. In another embodiment, the determination of a change in storage volume of the vessel 130 is utilized to calculate the rate of flow of an output. The term "storage volume" as used herein, is standard cubic feet, which is the measurement of a stored gas at atmospheric pressure, 14.7 psia. As can be appreciated, and according to Boyle's Law, where $P_1V_1=P_2V_2$ (where P=pressure and V=volume), if the temperature of a closed system is kept constant, there is an inversely proportional relationship between the absolute pressure and volume.

The change of the storage volume of the vessel 130 is determined by the programmable logic controller 150 by utilizing formulas programmed into the programmable logic controller. In one embodiment, the programmable logic controller 150 utilizes Boyle's Law, $P_1V_1=P_2V_2$, to determine the change in storage volume of the vessel 130. The change in storage volume of the vessel 130 is used to calculate the rate of flow of output 124 from the vessel 130. In one embodiment, the rate of flow of the output 124 from the vessel 130 is calculated by dividing the change in storage volume of the vessel ($V_A$) by the difference between the stop time and the start time (time), standard cubic feet per minute (SCFM)=$V_A$/time.

Referring back to FIG. 2, in method 200, after calculating the rate of flow of the output 124 from the vessel 130, the programmable logic controller 150 continues to monitor the output generation device 120 as shown by direction path 272. It is contemplated that the programmable logic controller 150 can carry out one or more steps at any given time, that is, the programmable logic controller may simultaneously monitor the output generation device 120 and calculate the flow of the output 124 from the vessel 130.

Likewise, referring back to FIG. 3, in method 300, after calculating the rate of flow of the output 124 from the vessel 130, the method may start again. Method 300 may be user-initiated, e.g., conducted after a user enters instructions into the programmable logic controller via the interface 152, or may be programmed in the programmable logic controller 150 to be conducted at predetermined times.

Referring to both FIGS. 2 and 3, it is contemplated that the rate of flow calculated in step 270 may be provided to a user of the system 100. For example, the rate of flow is provided by the programmable logic controller 150 to a user through the user interface 152. After receiving information about the rate of flow of the output 124 from the vessel 130, the user may modify or alter the amount of output provide by output generation device 120 to the vessel. Alternatively, the user may alter or modify the amount of output 124 leaving the vessel 130 depending on the rate of flow calculated by the programmable logic controller 150.

EXAMPLE

In one example, an average flow rate of a gas from a vessel, such as a buffer tank is determined. An output generation device, for example, a pressure swing adsorption (PSA) system, generates a gas that is delivered to a storage vessel, such as a buffer tank. A programmable logic controller is in communication with the PSA and buffer tank. The programmable logic controller monitors the status of the PSA and determines whether the gas is being provided to the buffer tank. A measurement device in communication with the buffer tank records the pressure in the buffer tank, while the programmable logic controller records times at which the gas is being generated by the PSA and the times at which the gas is not being generated by the PSA.

The programmable logic controller is programmed to employ one or more of the following formulas to determine the average flow rate of the gas from the vessel:

$P_a$=Pressure Atmospheric $V_t$=Volume Tank
$P_1$=First Pressure $V_1$=Volume First, calculated at First Pressure
$P_2$=Second Pressure $V_2$=Volume Second, calculated at Second Pressure
　　$V_a$=Volume at atmospheric pressure
　　$V_\Delta$=Volume Delta (change in volume)
SCF=Standard Cubic Feet (Volume of a gas at atmospheric pressure)
SCFM=Standard Cubic Feet per Minute The Storage Volume (SCF) in the buffer tank is equal to the volume of the buffer tank at atmospheric pressure ($P_a$).

The Storage Volume (SCF) in the buffer tank at a higher pressure, per Boyle's Law is equal to:

$$P_a V_a = P_1 V_t \rightarrow V_a = P_1 V_t/P_a \rightarrow V_1 \text{(wherein } V_1 \text{ is equal to } V_a \text{ and is obtained by solving for } V_a\text{)}.$$

The change in Storage Volume (SCF) from a first to a second pressure equals:

$$V_\Delta = V_1 - V_2 \rightarrow V_\Delta = (P_1 V_t/P_a) - (P_2 V_t/P_a) \rightarrow V_\Delta = (P_1 - P_2) V_t/P_a$$

The flow rate is equal to the change in Storage Volume (SCF) divided by the difference in time between the start time (recorded when the first pressure is measured) and the stop time (recorded when the second pressure is measured):
SCFM=$V_\Delta$/time Although the disclosed subject matter has been shown and described with respect to the detailed embodiments thereof, it will be understood by those of skill in the art that various changes may be made and equivalents may be substituted for elements thereof without departing from the scope of the disclosed subject matter. In addition, modifications may be made to adapt a particular situation or material to the teachings of the subject matter without departing from the essential scope thereof. Therefore, it is intended that the disclosed subject matter not be limited to the particular embodiments disclosed in the above detailed description, but that the disclosed subject matter will include all embodiments falling within the scope of the disclosure.

What is claimed is:

1. A system for determining a rate of flow of an output from a vessel, the system comprising:
   a vessel having a fixed volume of storage, the vessel comprising an inlet for receiving output produced by an output generation device, wherein the output generation device is a pressure swing adsorption system having a standby mode and an operational mode, the standby mode occurring any time the output generation device is not generating output and the operational mode occurring any time the output generation device is generating output;
   a measuring device for measuring a first pressure and a second pressure in the vessel, the first pressure measured when the output generation device enters the standby mode and the second pressure measured when the output generation device enters the operational mode, the standby mode of the output generation device establishes a start time of a time period and the operational mode establishes a stop time of the time period, wherein during the time period a variable amount of output is released from the vessel; and
   a programmable logic controller configured to calculate a rate of flow of the output from the vessel, wherein an amount of flow of the output from the vessel is calculated using the first pressure and the second pressure, and the rate of flow is then calculated using the amount of flow of the output from the vessel, the start time of the time period and the stop time of the time period.

2. A system according to claim 1, wherein the system does not include a flow meter.

3. A system according to claim 1, wherein the programmable logic controller includes a user interface.

4. A system according to claim 3, wherein the user interface comprises a display to convey the rate of flow of the output to a user.

5. A system according to claim 1, wherein the vessel is a tank.

6. A method for determining a rate of flow of an output from a vessel, the method comprising:
   generating output with an output generation device and providing the output to a vessel, wherein the output generation device is a pressure swing adsorption system;
   measuring a first pressure in the vessel when the output is not provided to the vessel, a start time of a time period established when the output is not provided to the vessel;
   measuring a second pressure in the vessel when the output is provided to the vessel, a stop time of the time period established when the output is provided to the vessel, wherein during the time period, a variable amount of output is released from the vessel;
   calculating, in a programmable logic controller, a change in a volume of output stored in the vessel utilizing the first pressure and the second pressure; and
   utilizing the change in the volume of the output stored in the vessel, the start time of the time period and the stop time of the time period to calculate, in the programmable logic controller, a rate of flow of the output from the vessel.

7. A method according to claim 6, wherein the output is provided to the vessel when the output generation device is in an operational mode.

8. A method according to claim 6, further comprising closing a flow valve between the output generation device and the vessel, thereby not providing the output to the vessel.

9. A method according to claim 6, further comprising opening a flow valve between the output generation device and the vessel, thereby providing the output to the vessel.

10. A method according to claim 6, further comprising: providing the rate of flow of the output to a user.

11. A method according to claim 10, further comprising: adjusting an amount of output provided to the vessel based on the rate of flow of the output from the vessel.

12. A method according to claim 10, further comprising: monitoring a status of the output generation device.

13. A method according to claim 6, further comprising: displaying the rate of flow of the output on a display.

14. A method of determining a rate of flow of an output from a vessel, the method comprising:
    providing an output to a vessel, the vessel having a fixed volume of storage, the output generated by a pressure swing adsorption system having a standby mode and an operational mode, the standby mode occurring any time the pressure swing adsorption system is not generating output and the operational mode occurring any time the pressure swing adsorption system is generating output;
    measuring a first pressure in the vessel, the first pressure measured when the pressure swing adsorption system enters the standby mode, the standby mode of the pressure swing adsorption system establishes a start time of a time period;
    measuring a second pressure in the vessel, the second pressure measured after measuring the first pressure and when the pressure swing adsorption system enters the operational mode, the operational mode establishes a stop time of the time period, wherein during the time period a variable amount of output is released from the vessel; and
    in a programmable logic controller, calculating a rate of flow of the output from the vessel, wherein a change in a volume of output stored in the vessel is calculated using the first pressure and the second pressure and the rate of flow is then calculated using the amount of change in volume of the output stored in the vessel, the start time of the time period and the stop time of the time period.

15. A method according to claim 14, further comprising providing the rate of flow to a user.

16. A method according to claim 15, further comprising adjusting an amount of output to the vessel, wherein the adjustment is based on the rate of flow of the output.

17. A method according to claim 14, further comprising displaying the rate of flow to a user.

18. A system for determining a rate of flow of an output from a vessel, the system comprising:
    a vessel having a fixed volume of storage for an output, the vessel comprising an inlet for receiving the output produced by an output generation device, wherein the output generation device is a pressure swing adsorption system;
    a measuring device for measuring a first pressure and a second pressure in the vessel, the first pressure measured when the output is not provided to the vessel and the second pressure measured when the output is provided to the vessel, a start time of a time period established when the output is not provided to the vessel and a stop time of the time period established when the output is then provided to the vessel, wherein during the time period, a variable amount of output is released from the vessel; and
    a programmable logic controller configured to calculate a rate of flow of the output from the vessel, wherein an amount of flow of the output from the vessel is calculated using the first pressure and the second pressure, and the rate of flow is then calculated using the amount of flow of the output from the vessel, the start time of the time period and the stop time of the time period.

* * * * *